United States Patent Office 3,052,158
Patented Sept. 4, 1962

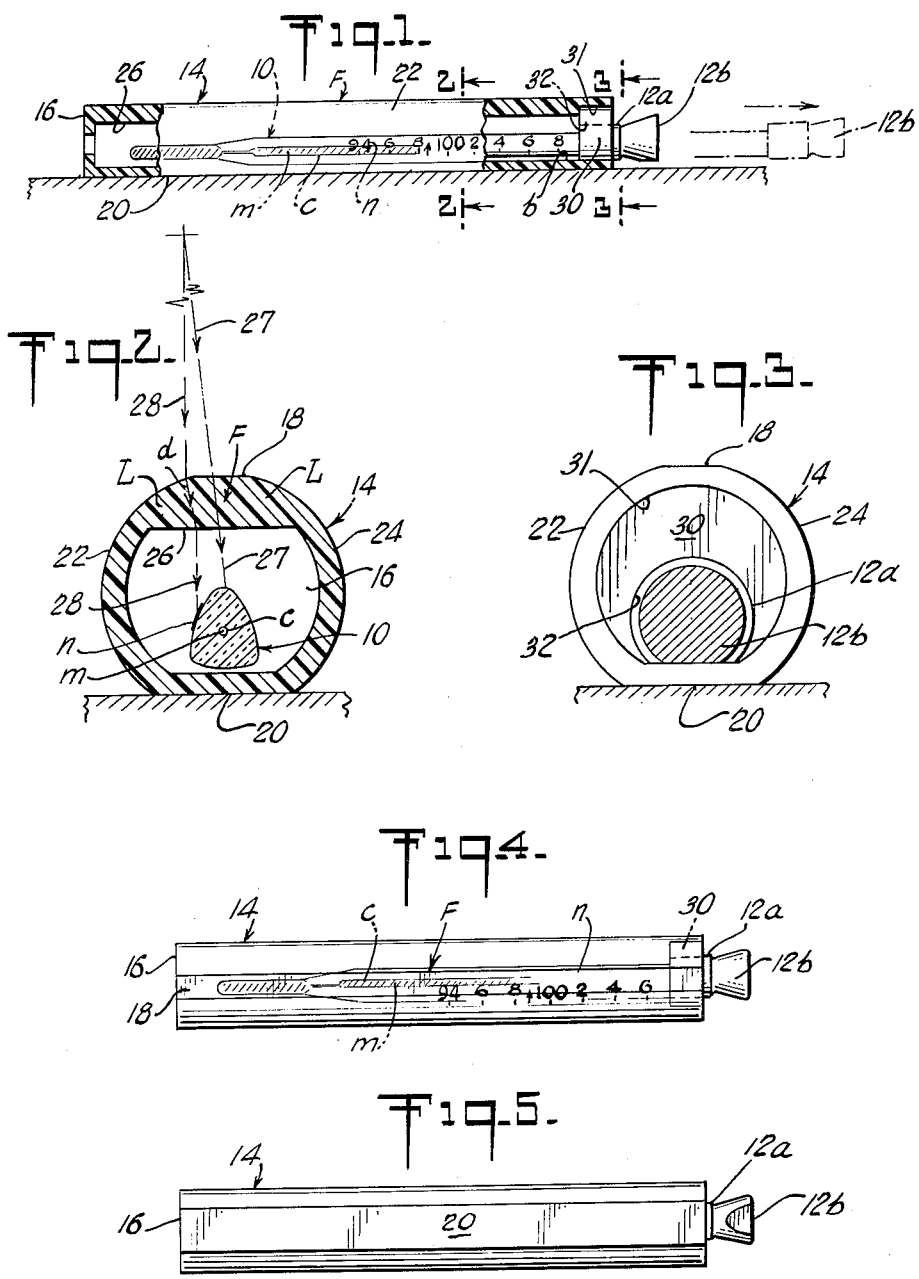

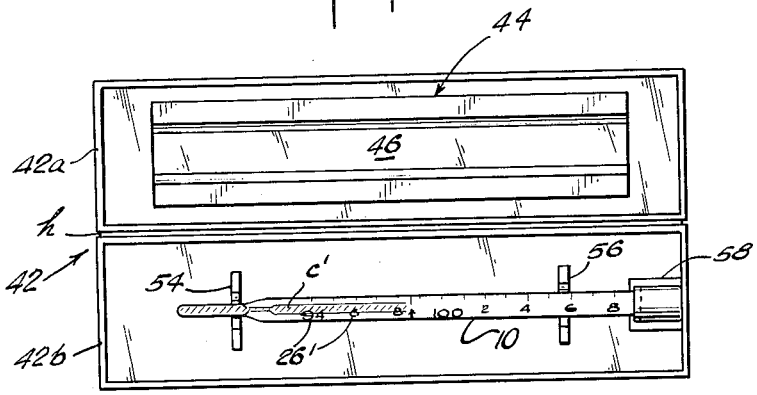
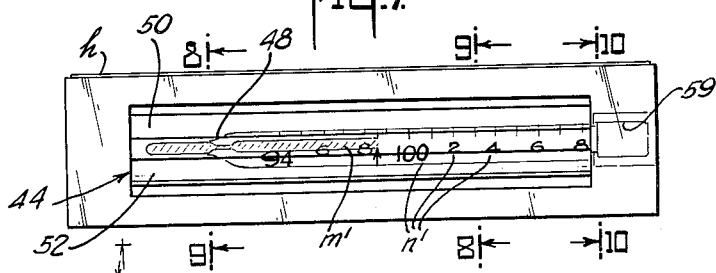
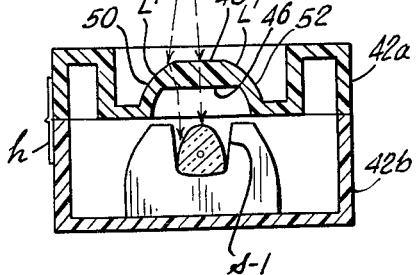
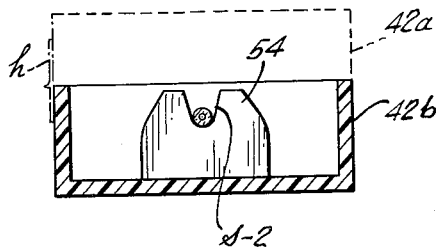
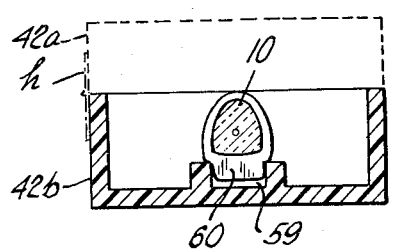

3,052,158
COMBINATION OF CLINICAL THERMOMETER
AND MAGNIFYING CASE
Arthur William Sonni, 3340 75th St.,
Jackson Heights 72, N.Y.
Filed Dec. 6, 1961, Ser. No. 157,447
2 Claims. (Cl. 88—39)

This invention relates to improvements in a combination of clinical thermometer and magnifying case and is a continuation-in-part of allowed application Serial No. 809,850, filed April 29, 1959, now abandoned.

It has heretofore been suggested to provide a case with a crowned top portion opposite a flat inside wall portion forming a lens to facilitate reading a thermometer inserted in the case but it has been necessary for the user to hold on to one end of the thermometer and try to line up the mercury column in the thermometer with the center crowned portion of the lens, by rotating the thermometer within the case, and then to read the calibrations which are on the thermometer but spaced laterally from the mercury column. Attempts to do this have been unsatisfactory for although the capillary tube of the thermometer which contains the mercury is magnified several times by the crowned top of the case this high magnification results in a very narrow viewing angle with the result that it is difficult for many users to locate the mercury column.

It is, accordingly, an object of this invention to provide an improved combination of thermometer and case which simplifies reading the thermometer and makes it easy to see both the mercury column and its calibrations.

Another object of this invention is to provide improved structure for a thermometer and case combination.

This invention will best be understood if the following description is read in connection with the drawings, in which:

FIGURE 1 is a side view partly in section of a case with a fever thermometer therein;

FIGURE 2 is a cross section taken on the line 2—2 of FIGURE 1;

FIG. 3 is a cross section taken on the line 3—3 of FIG. 1;

FIG. 4 is a top plan view of the combination of thermometer and case;

FIG. 5 is a bottom plan view of the combination of thermometer and case;

FIG. 6 is a top plan view of the combination of a thermometer and a two-part rectangular case which is a modification of the case shown in FIGS. 1–5 with the top portion of the case turned back in inoperative position;

FIG. 7 is a top plan view similiar to FIG. 6 but showing the top portion of the case closed and in operative position;

FIG. 8 is a view partly in cross section taken on the line 8—8 of FIG. 7;

FIG. 9 is a view partly in cross section taken on the line 9—9 of FIG. 7; and

FIG. 10 is a view partly in cross section taken on the line 10—10 of FIG. 7.

In the embodiment of the invention shown in FIGS. 1–5, a clinical thermometer 10 is provided, which is conventional except for having the successively enlarged portions 12a and 12b at its rear end.

Case 14 is provided, which is adapted to receive thermometer 10 at a predetermined rotary angle and to facilitate reading of the thermometer both by making the mercury column easy to locate and magnifying the calibrating numerals n which are disposed along the capillary tube c in which the mercury column advances in proportion to the temperature of the patient.

The case is tubular and somewhat shorter than the thermometer and has a closed end 16. Its outer surface is defined by a flat surface 18 at the top and a flat surface 20 at the bottom which is much wider than the flat surface 18 at the top of the case, and by the convexly curved side walls 22 and 24. Having convexly curved side walls is important especially adjacent the narrow flat top surface portion 18.

The inner surface of the case comprises a flat surface 26 extending under and parallel to the flat outer surface portion 19, and also extending for a distance under the curved outer surface portions 22 and 24 which adjoin the flat intermediate portion 18 and, together with the flat inner top surface portion 26, form the lenses, L, L. At least the portions of the case forming lenses L, L, including the upper portions of convex surfaces 22 and 24, and the intermediate top portion F which comprises the flat outer surface portion 18 and a portion of the flat inner surface portion 26, are transparent. Desirably, the whole case is formed from transparent plastic such, for example, as methylmethacrylate.

As shown herein the bore b of the case is located essentially in the lower half of the case and is of greater diameter than the diameter of the thermometer except for the enlarged portion 12a of the theremometer which has the cross sectional shape and size of the portion 31 of the bore of the case adjacent its open end to predetermine the angular position of the thermometer in the case.

As shown herein a plug 30 having the bore 32 is inserted in the open end of the case and the thermometer is not only indexed within the case due to the shape of bore 32, but it is also frictionally engaged therein, preventing the thermometer from being inadvertently dislodged from the case.

When inserted in the case, the portion of the face of the thermometer which shows the length of the mercury column m within the capillary tube c is in vertical alignment with the flat outer surface portion 18 and the flat inner surface portion 26 of the case, and the mercury column is easily located and seen along a line of sight indicated by the arrow 27 extending in a straight line through the flat outer and inner surfaces 18 and 26. At the same time the numerals n are readily visible along the line of sight indicated by the arrow 28, which passes through the curved outer surface portion 22 adjoining the flat outer surface portion 18, and, after being deflected, as indicated at d, due to the curvature of said outer surface portion, continues through the flat inner surface portion 26 of the case. In passing successively through the curved outer surface portion 22 of the case and the flat inner surface portion 26, the numerals n are magnified. Thus the mercury column is seen unmagnified along lines of sight anywhere within a wide range of vision angles, i.e., entering anywhere along the flat surface portion 18, and the numerals n are seen magnified.

The person reading the thermometer does not need to rotate it in order to bring the mercury column into view. The mercury column is aligned with the parallel flat inner and outer surfaces 18 and 26 of the top of the case and it is only necessary to place the case on a flat surface with the thermometer in it and look straight down through these parallel flat surface portions, i.e., top portion F of the case, to see the mercury column m. At the same time along another line of sight passing through a lens portion L of the case, i.e., curved outer surface 22 and flat inner surface 26, he sees numerals n magnified.

In FIGS. 6–10 an embodiment of the invention is shown which is a modification of the embodiment shown in FIGS. 1–5.

The thermometer 10 is shown in combination with a two-part rectangular case 42 comprising top and bottom portions 42a and 42b hinged together as by hinge members h, and having internal support means adapted to receive a thermometer at a predetermined rotary angle with respect to a lens portion of the upper portion of the case and to facilitate reading of the thermometer both by making the mercury column easy to locate and magnifying the calibrating numerals $n^1$ which are disposed along the capillary tube $c^1$ in which the mercury advances in proportion to the temperature of the patient.

In the top wall of the case is a portion 44 extending longitudinally of the case which corresponds to the upper portion of the case shown in FIGS. 1–5. Its outer surface is defined by a flat surface 48 between the convexly curved side walls 50 and 52. The inner surface of portion 44 comprises a flat surface 46 which is wider than the flat portion 48 of the outer surface and extends parallel to the flat outer surface portion 48 and also extends for a distance under the curved outer surface portions 50 and 52 which adjoin the flat intermediate portion 48 and, together with the flat inner surface portion 46, forms the lenses $L^1$, $L^1$. At least portion 44 of the top wall of the case is transparent. Desirably the whole case is formed from transparent plastic, such, for example, as methylmethacrylate.

Projected up from the inside surface of the bottom portion 42b of the case are the thermometer support members 54, 56 and 58. The upper surfaces of members 54 and 56 are shaped with re-entry slots $s$–1 and $s$–2 to receive and cradle a thermometer, the re-entry slots being respectively shaped to correspond with the cross sectional shape of the portions of a thermometer which they receive. The portions of the thermometer which will rest upon supports 54 and 56 respectively are determined both by the positioning of members 54 and 56 within the bottom portion of the case and also by the positioning of member 58 which is an elevation extending upwardly from the bottom of the case and defining an interior cavity or space 59, the internal cross section of which matches, and is adapted to receive, a projection 60 extending from the bottom of the thermometer adjacent it rear end. Members 58 and 60 co-act to provide indexing means whereby the thermometer can be placed upon the supports only in a position such that the portion of the face of the thermometer which shows the length of mercury column $m^1$ within the capillary tube $c^1$ is in vertical alignment with the flat outer surface portion 48 and the flat inner surface portion 46 of the portion 44 of the top of the case, and the mercury column is easily located and seen along a line of sight indicated by the arrow 60 extending in a straight line through the flat outer and inner surface portions 48 and 46. At the same time, the numerals $n^1$ are readily visible along the line of sight indicated by the arrow 62, which passes through the curved outer surface portion 50 adjoining the flat outer surface portion 48, and after being deflected, as indicated at $d^1$, due to the curvature of said outer surface portion, continues through the flat inner surface portion 46 of the case. In passing successively through the curved outer surface portion 50 of the case and the flat inner surface portion 46, the numerals $n^1$ are magnified. Thus the mercury column is seen unmagnified along lines of sight anywhere within a wide range of visible angles—i.e., entering anywhere along the flat surface portion 48—and the numerals $n^1$ are seen magnified.

As in the case of the embodiment of the invention shown in FIGS. 1–5, a person using the combination of case and thermometer shown in FIGS. 6–10 does not not need to rotate the thermometer in order to bring the mercury column into view. The mercury column is aligned with the parallel flat inner and outer surfaces 46 and 48 of the portion 44 of the top of the case and it is only necessary to place the case on a flat surface with the thermometer in it and look straight down through these parallel flat surface portions to see the mercury column $m^1$. At the same time, along another line of sight passing through a lens $L^1$ of the case—i.e., curved outer surface 50 and the flat inner surface 46—he sees numerals $n^1$ magnified.

This inventon provides a structure by means of which the mercury column is easy to locate, much easier to locate than if the entire part F of the case shown in FIGS. 1–5 or the entire part 44 of the top of the case shown in FIGS. 6–10 constituted a lens, and the numerals $n$ and $n^1$ which calibrate the mercury columns respectively were magnified. If all of part F or of part 44 were a lens the viewing angle would be very small and it would be difficult to locate and see the mercury column. By flattening the intermediate portion of the outer surface of the parts F and 44 respectively the width of the viewing angle is substantially increased. In this way, an effective compromise is obtained between magnification and the viewing angle, making it much easier for the average person to read the thermometer. Very satisfactory results have been obtained in both embodiments of the invention, using a part F, or part 44, in which the flat outer surface portion 18 or 48 is between two-and-three-sixteenths of an inch, and the flat inner surface portion 26 or 46 is substantially wider than surface portion 18 or 48 respectively.

There has thus been provided a thermometer and case combination in which the above stated objects are realized in a thoroughly practical way.

What is claimed is:

1. In combination a clinical thermometer of the kind comprising a bulb filled with mercury and a tube extending longitudinally and communicating with the bulb and having calibrations extending along and laterally displaced from the tube, and a case adapted to receive the thermometer therein, the thermometer having at least a portion with a non-circular cross-section and the case having at least a top portion which is transparent, and at least a portion the internal cross-section of which matches the said cross-section of the thermometer and predetermines the rotary angle of the thermometer within the case, the outer surface of the case having a flat bottom portion and a crowned upper portion, at least part of which is crowned, and is characterized by a longitudinally extending substantially flat portion, at least a portion of the inner surface of the upper portion of the case being flat and parallel with the said substantially flat portion of the outer surface of the upper portion of the case, whereby, when the case with the thermometer therein is resting upon its said flat bottom surface portion, the face of the thermometer which is to be read will be directly under the said flat portions of the inner and outer surfaces of the upper part of the case, and when the combination is viewed from above the said tube any mercury therein will be seen along a line of sight extending through the said flat outer and inner surface portions of the top of the case, and substantially unmagnified thereby, and at the same time the eye of the observer will also span a portion of the curved outer surface of the upper part of the case which is adjacent the said flat outer surface portion and the said calibrations will be seen magnified along a line of sight extending through said adjacent portion of the curved outer surface and through a portion of the said flat inner surface of the upper portion of the case which is below the said portion of the curved outer surface.

2. In combination a clinical thermometer of the kind comprising a bulb filled with mercury and a tube extending longitudinally and communicating with the bulb and having calibrations extending along and laterally displaced from the tube, and a case for the thermometer including means for predetermining the rotary angle of the thermometer within the case, the outer surface of the case having a flat bottom portion and an upper portion at least a part of which is crowned and is characterized by a longitudinally extending substantially flat outer surface portion adjoining a curved outer surface portion, at least a portion of the inner surface of the upper portion of the case being flat and parallel with the said substantially flat outer surface portion, whereby, when the case with the thermometer therein is resting upon its said flat bottom surface portion, the face of the thermometer which is to be read will be directly under the said flat and parallel portions of the inner and outer surfaces of the upper part of the case, and when the combination is viewed by looking down from directly above the flat surface portion any mercury in said tube will be seen along a line of sight extending through the said flat outer and inner surface portions of the top of the case, and will be substantially unmagnified thereby, and at the same time the eye of the observer will also span a portion of the curved outer surface of the upper part of the case which is adjacent the said flat outer surface portion and the said calibrations will be seen magnified along a line of sight extending through said adjacent portion of the curved outer surface and through a portion of the said flat inner surface of the upper portion of the case which is below the said portion of the curved outer surface.

References Cited in the file of this patent

UNITED STATES PATENTS

| | | |
|---|---|---|
| 666,094 | Hicks | Jan. 15, 1901 |
| 2,313,688 | Wappner et al. | Mar. 9, 1943 |
| 2,460,051 | Welch | Jan. 25, 1949 |
| 2,535,628 | Fairchild | Dec. 26, 1950 |
| 2,554,854 | Chomes | May 29, 1951 |
| 2,712,237 | Margolis | July 5, 1955 |
| 2,787,937 | Prisament | Apr. 9, 1957 |

FOREIGN PATENTS

| | | |
|---|---|---|
| 574,849 | Great Britain | Jan. 23, 1957 |